US009759194B2

(12) United States Patent
Tucciarone

(10) Patent No.: US 9,759,194 B2
(45) Date of Patent: Sep. 12, 2017

(54) PORTABLE POWER GENERATOR

(71) Applicant: John Tucciarone, Poughquag, NY (US)

(72) Inventor: John Tucciarone, Poughquag, NY (US)

(*) Notice: Subject to any disclaimer, the term of this patent is extended or adjusted under 35 U.S.C. 154(b) by 215 days.

(21) Appl. No.: 14/756,858

(22) Filed: Oct. 23, 2015

(65) Prior Publication Data

US 2017/0114776 A1 Apr. 27, 2017

(51) Int. Cl.
*F03D 9/00* (2016.01)
*H02K 7/18* (2006.01)
*H02J 7/00* (2006.01)
*H02J 7/35* (2006.01)
*F03D 3/00* (2006.01)
*F03D 3/04* (2006.01)
*F03D 9/30* (2016.01)
*F03D 13/20* (2016.01)

(52) U.S. Cl.
CPC ......... *F03D 9/007* (2013.01); *F03D 3/005* (2013.01); *F03D 3/04* (2013.01); *F03D 9/002* (2013.01); *F03D 9/30* (2016.05); *F03D 13/20* (2016.05); *H02J 7/0068* (2013.01); *H02J 7/355* (2013.01); *H02K 7/183* (2013.01)

(58) Field of Classification Search
CPC .......... H02S 10/10; H02S 10/12; H02S 10/40; F03D 9/007; F03D 9/00; F03D 9/10; F03D 9/19; F03D 9/25; F03D 9/32; F03D 9/34; F03D 13/10; F03D 13/20; F03D 3/04; F03D 3/0445
USPC ......... 307/72; 415/4.2, 4.3, 4.4, 4.5; 290/44, 290/55
See application file for complete search history.

(56) References Cited

U.S. PATENT DOCUMENTS 3,876,925 A * 4/1975 Stoeckert ............... B60K 16/00
  180/2.2
7,339,286 B1   3/2008 Chen
(Continued)

*Primary Examiner* — An Luu
(74) *Attorney, Agent, or Firm* — Joseph L. Spiegel

(57) ABSTRACT

A portable generator includes: a case having a front, symmetrical air-foil shaped sidewalls, Kamm tail rear and flat base; a wind turbine; a telescoping shaft hingedly connected to the case base for supporting the wind turbine, in a horizontal and a range of vertical positions for receiving wind without the case; an offset air entrance hole within the case front for directing ambient air towards the wind turbine when in the case; an elliptical, funnel-shaped channel extending from the air entrance hole towards the turbine blades capturing the wind from the air entrance hole and directing it towards the turbine blade assembly; an air escape hole within the case rear for directing air out of the case; ties for holding the pole in a vertical position; one or more batteries for supplying DC power to an AC inverter; an inverter DC for converting AC from the generator unit; a solar array for augmenting and supplying DC power to the batteries; the AC inverter to supply energy to AC electrical equipment; an electrical outlet connected to the inverter; and, a hinged somewhat rounded cover for the case that in horizontal position forms a water tight seal with the sidewalls for the case and in vertical position allows for redirection of the solar array. The cover is secured to the case via a locking hinge arrangement. The case also includes retractable wheels and handle to allow for removal and relocation of the power generator.

10 Claims, 8 Drawing Sheets

UNIT SHOWN OPEN

(56) References Cited

U.S. PATENT DOCUMENTS

| | | |
|---|---|---|
| 7,802,641 B2 | 9/2010 | Friedmann |
| 7,868,476 B2 * | 1/2011 | Baca ............... B60K 6/485 |
| | | 290/55 |
| 8,362,636 B2 | 1/2013 | Ling |
| 2010/0207452 A1 | 8/2010 | Saab |
| 2011/0133454 A1 | 6/2011 | Vo |

* cited by examiner

UNIT SHOWN OPEN

UNIT SHOWN CLOSED

UNIT SHOWN ON GROUND

UNIT SHOWN ON GROUND
W/SOLAR PANEL ROTATED

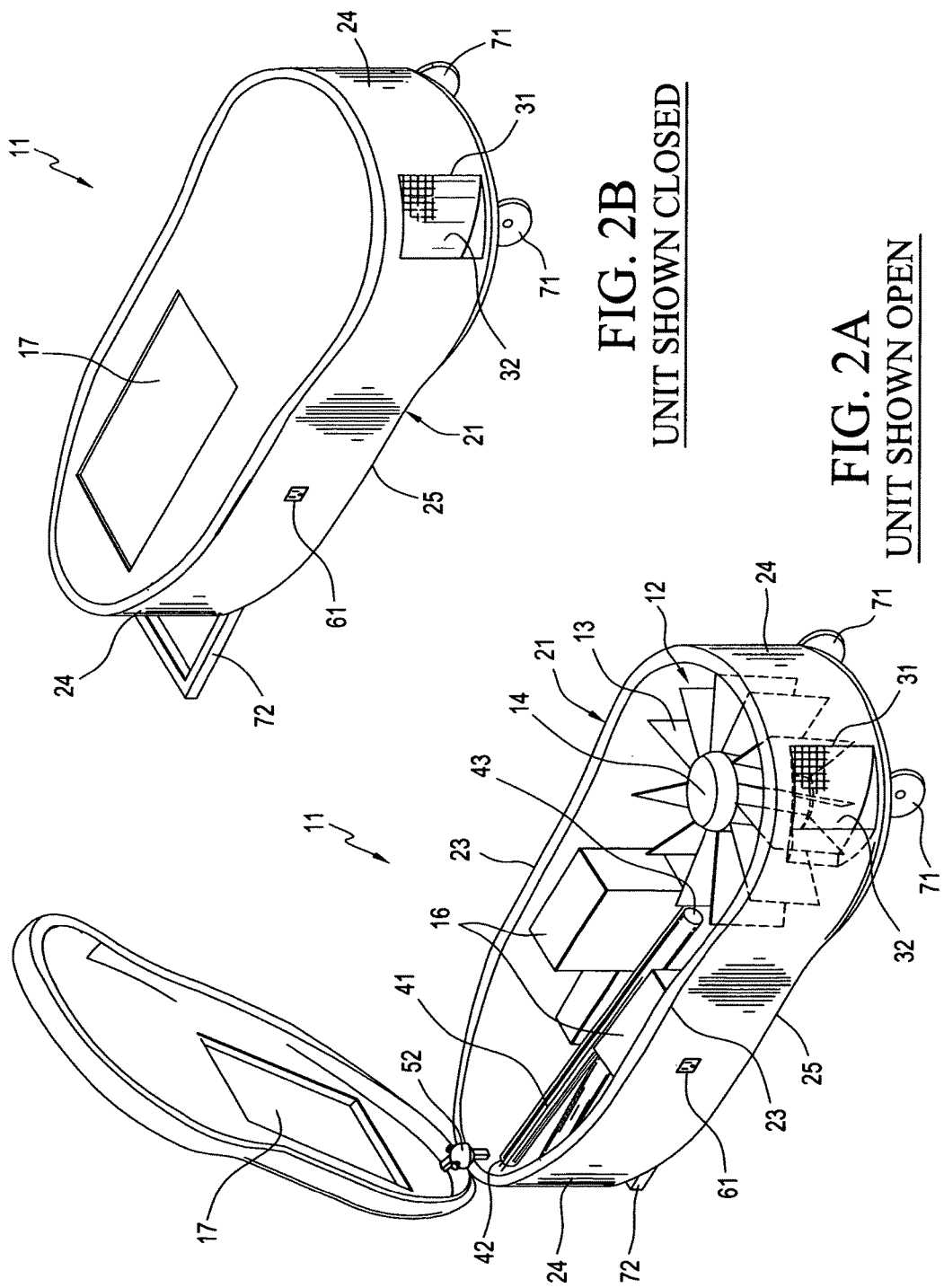

UNIT SHOWN ON GROUND

UNIT SHOWN ON GROUND
W/SOLAR PANEL ROTATED

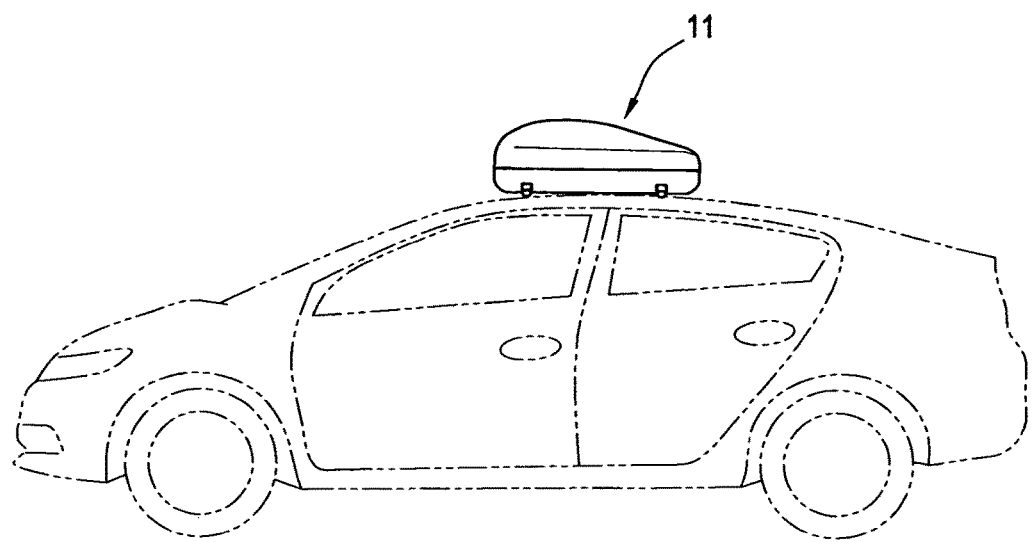
FIG. 3A
FIG. 3B
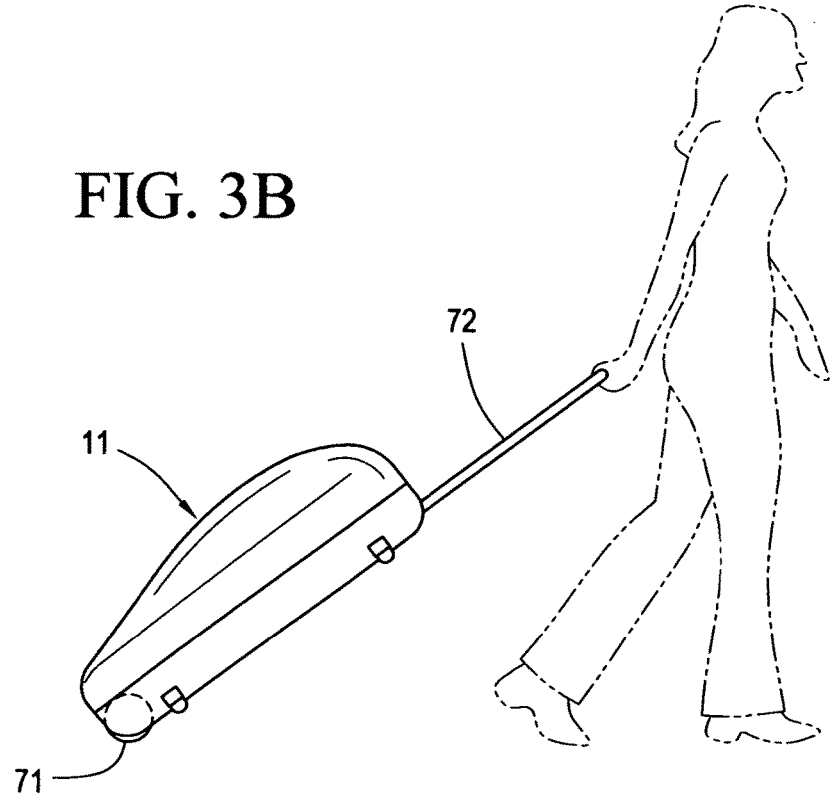

PORTABLE POWER GENERATOR

BACKGROUND OF THE INVENTION

1. Field of the Invention

This invention relates, generally, to an electrical power generator that is portable in nature

2. Description of the Prior Art

The prior art is replete with portable electrical generators. Examples may be found in: U.S. Pat. No. 8,864,207 to Hixson, et al.; U.S. Pat. No. 8,654,512 to Van Straten; U.S. Pat. No. 8,362,636 to Ling; U.S. Pat. No. 8,134,247 to Gu; U.S. Pat. No. 7,339,286 to Chen; US Pat. Appl'n. No. 2011/0133454 to Vo; and, US Pat. Appl'n. No. 2010/0207452 to Saab. Such generators may be used as stand-alone units, or on motor vehicles such as a truck or an RV. They are particularly useful with RVs where they are dry-docked, not hooked up to anything, or trucks and the RVs' or trucks' electrical systems are not able to function. The alternative would be to use a propane or gas generator or keep the vehicle idling, which is expensive, and of environmental concern because of the exhaust generated. The prior art portable electric generators result inefficient energy production and high drag coefficients.

SUMMARY

An object then of the invention is to provide an efficient electrical power generator that may utilize wind power and solar power.

Another object is such a unit that may be used on a vehicle such as an RV or truck, but is portable and may be used as a stand-alone unit.

These and other objects, features and advantages are accomplished in accordance with the teachings of the present invention, one illustrative embodiment of which comprises a portable electrical power generator. The power generator includes: a case having a front, symmetrical air-foil shaped sidewalls, Kamm tail rear and flat base; a wind turbine including a blade assembly and a generating unit for developing electrical power when the blade assembly is exposed to a flow of air; a telescoping shaft hingedly connected to the case base for supporting the wind turbine, in a horizontal position for receiving wind within the case, to a range of vertical positions for receiving wind without the case; an offset air entrance hole within the case front for directing ambient air towards the wind turbine when in the case; an elliptical, funnel-shaped channel extending from the air entrance hole towards the turbine blades, the channel formed in the interior of a sidewall capturing the wind from the air entrance hole and directing it towards the turbine blade assembly to effect rotation of its blades; an air escape hole within the case rear for directing air out of the case from the interior of the case; ties for holding the pole in a vertical position; one or more batteries within the case connected to the generating unit for storing the energy; an inverter DC for converting AC from the generator unit and supplying it to batteries and directly to DC electrical equipment; a solar array for augmenting and supplying DC power to the batteries; one or more batteries for supplying DC power to an AC inverter; the AC inverter to supply energy to AC electrical equipment; an electrical outlet connected to the inverter; and, a hinged somewhat rounded cover for the case that in horizontal position forms a water tight seal with the sidewalls for the case and in vertical position allows for redirection of the solar array. The cover is secured to the case via a locking hinge arrangement. The case also includes retractable wheels and handle to allow for removal and relocation of the power generator.

BRIEF DESCRIPTION OF THE DRAWING

Other objects, features and advantages of the present invention will be apparent from the following detailed description and accompany drawing, wherein:

FIG. 2A is a perspective view taken from the side front showing the case in open position;

FIG. 2B is a perspective view similar to FIG. 2A with the case in closed position;

FIG. 3A is a side view of the unit mounted on a vehicle; and,

FIG. 3B is a side view shoeing the unit being pulled by a pedestrian.

DETAILED DESCRIPTION

Figure 1:
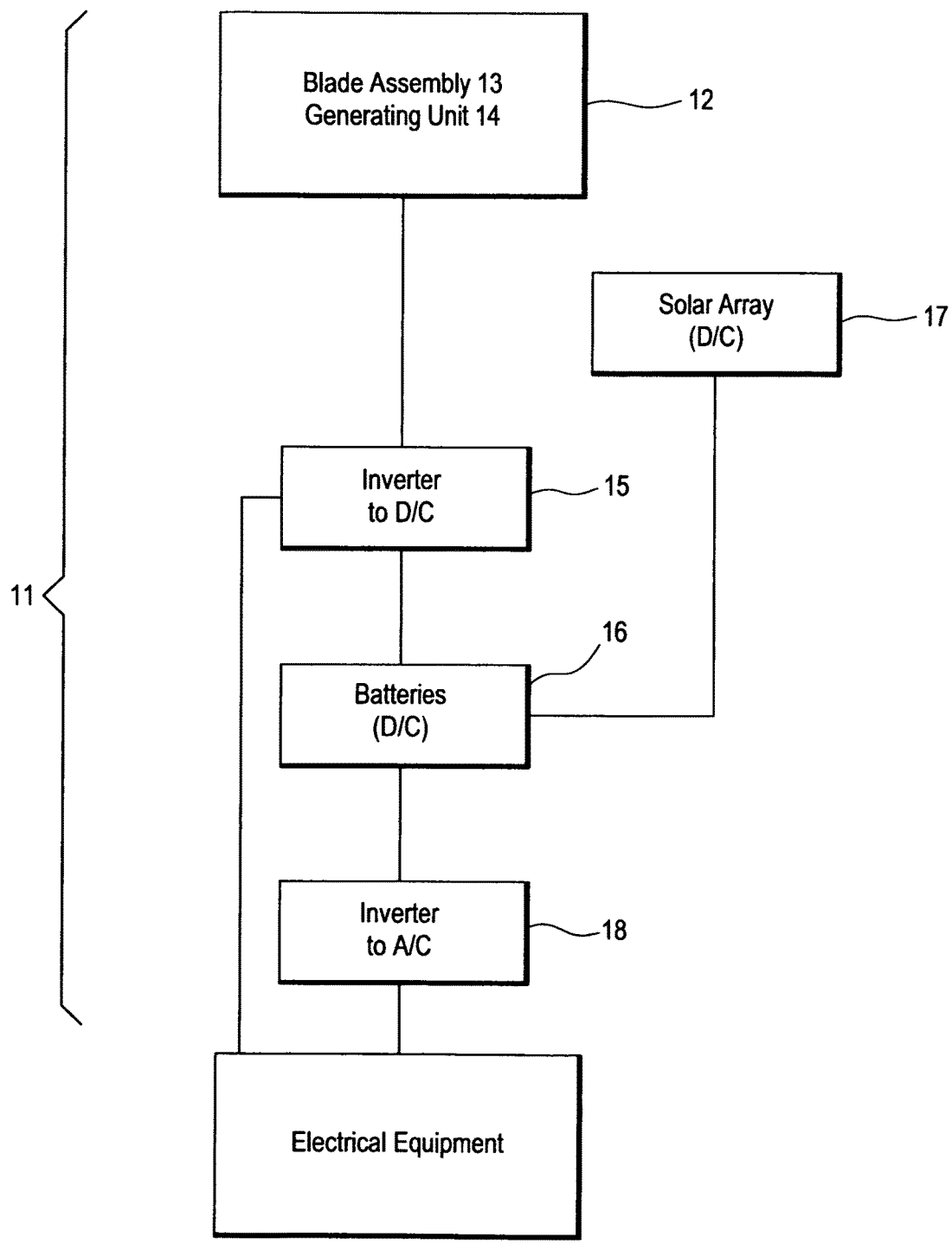
FIG. 1 is a schematic diagram depicting the layout and interconnection among the components of the electrical portion of the portable power generator unit, supplying power to electrical equipment.

Referring first to FIG. 1, there is a schematic diagram depicting the layout and interconnection among the components of the electrical portion of the portable power generator 11. Generator 11 is seen as including: a wind turbine 12 including blade assembly 13 and a generating unit 14 operatively coupled for developing electrical power when blade assembly 13 is exposed to a flow of air; an inverter DC 15 for converting AC from the generator unit 14 and supplying it to batteries 16 and directly to DC electrical equipment; a solar array 17 for augmenting and supplying DC power to the batteries 16; one or more batteries 16 for supplying DC power to AC inverter 18; the AC inverter 18 to supply energy to AC electrical equipment. The number of batteries, inverters and the wiring for same will be predicated on application/usage of the generator 11.

Referring next to FIGS. 1A, 1B, 2A and 2B, generator unit 11 is seen as including a waterproof case 21, as of PVC, although any metal that would not rust, carbon fiber, etc., could be used. Case 21 has: aerodynamic front 22 smoothly transitioning to symmetrical air-foil shaped sidewalls 23; Kamm tail rear 24; and, flat base 25.

The air-foil configuration directly affects the wind currents over the case 21, aiding in the compression of the air flow as it interacts with the blade assembly 13, increases the speed of the air flow and reduces the drag coefficient of the case 21, when in motion. All electrical components are held within waterproof boxes.

As best seen in FIGS. 2A through 2D, the case 21 has an air entrance hole 31 within the front 22 of case 21 for capturing the desired air flow and for directing the moving air towards the wind turbine blades 13 when in the case 21. Hole 31 is offset with respect to the front to rear axis of case 21 to capture air when the case 21 is in motion, where it is most dense. The optimal location for the offset air entrance hole 31 is easily determined by a smoke or dye test, common in aerodynamic testing. Placing hole 31 directly in front would create more drag.

One interior sidewall has formed into it an elliptical, funnel shaped channel 32 capturing the wind from the air entrance hole 31 and directing it towards the wind turbine 12 to effect faster rotation of its blade assembly 13. The funnel shape (wider at the beginning, narrower at the end) further speeds up air flow to the blades.

Case 21 further includes an air escape hole 33 within the rear 24 of case 21 along its axis for directing air out of the case 21 from the interior of the case 21. The internal design is such that volumetric flow of residual air is equally distributed as it passes through the case 21 and is evacuated through the air escape hole 33. This also minimizes the possibility of undesirable turbulence developing internally and externally.

Screens 34, 35 may be placed over the air entrance 31 and air escape 33 holes to minimize debris entering the case 21.

The generator 11 further includes a telescoping shaft 41 hingedly connected to the base at 42 for supporting the wind turbine 12 in a horizontal position for receiving wind within the case 21, to a vertical position for receiving wind without the case 21. The shaft 41 is also hinged at the top at 43 to allow for wind turbine repositioning when the shaft 41 is in a vertical position. The telescopic nature of the shaft 41 allows for height adjustment, permitting wind turbine 12 seating within the case 21 to various heights when lifted to a vertical position. In stand-alone mode, the generator 11 can be used for camping, at job sites, etc.

When shaft 41 is in vertical position it may be supported in place by a series of ties or guy wires. 44.

The power generator 11 includes one or more batteries 16 within the case 11 connected to the turbine power generating unit 14 for storing the electrical energy developed.

Generator 11 further includes an inverter DC 15 within the case 21 for converting AC from the generator unit 14 and supplying it to batteries 16 and directly to DC electrical equipment.

Batteries 16 supply DC power to AC inverter 18 within case 21. AC inverter 18 then may supply energy to AC electrical equipment.

The batteries 16 and inverters 15, 18 are molded in boxes against sidewalls 23.

The generator 11 includes a somewhat rounded cover 51 that in horizontal position forms a water tight seal with the sidewalls 23 for the case 21. A recessed area within cover 51 allows for installment of a solar array 17, while the cover 51 still maintains an aerodynamic shape. A ball joint is provided at 52 between cover 51 and case 21 to allow for redirection of the solar array 17 towards a light source (sun). The cover 51 is secured to the case 21 via a locking hinge arrangement (not shown).

A common usage for the generator 11 will be to a vehicle such as a truck or RV, and vertical positioning of the wind turbine 12 allows the wind turbine 12 to continue in operation while the vehicle is stopped.

The generator 11 is provided with an electrical outlet 61 for connection to electrical equipment (not shown), or for charging additional batteries.

Figures 1A, 1B:
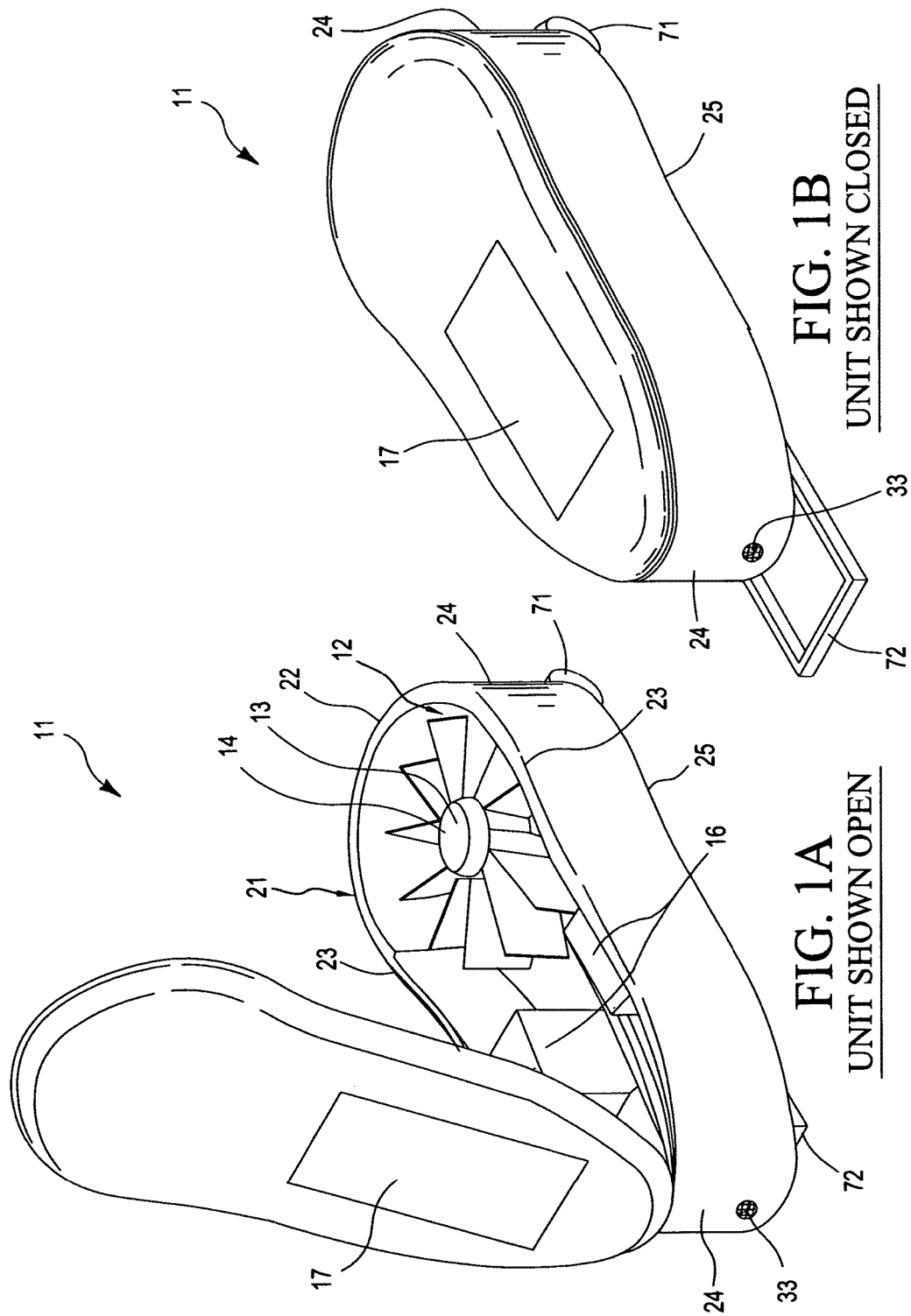
FIG. 1A is a perspective view of the generator unit with its case shown open.
FIG. 1B is a perspective view of the generator unit with its case shown closed.
Figure 1C:
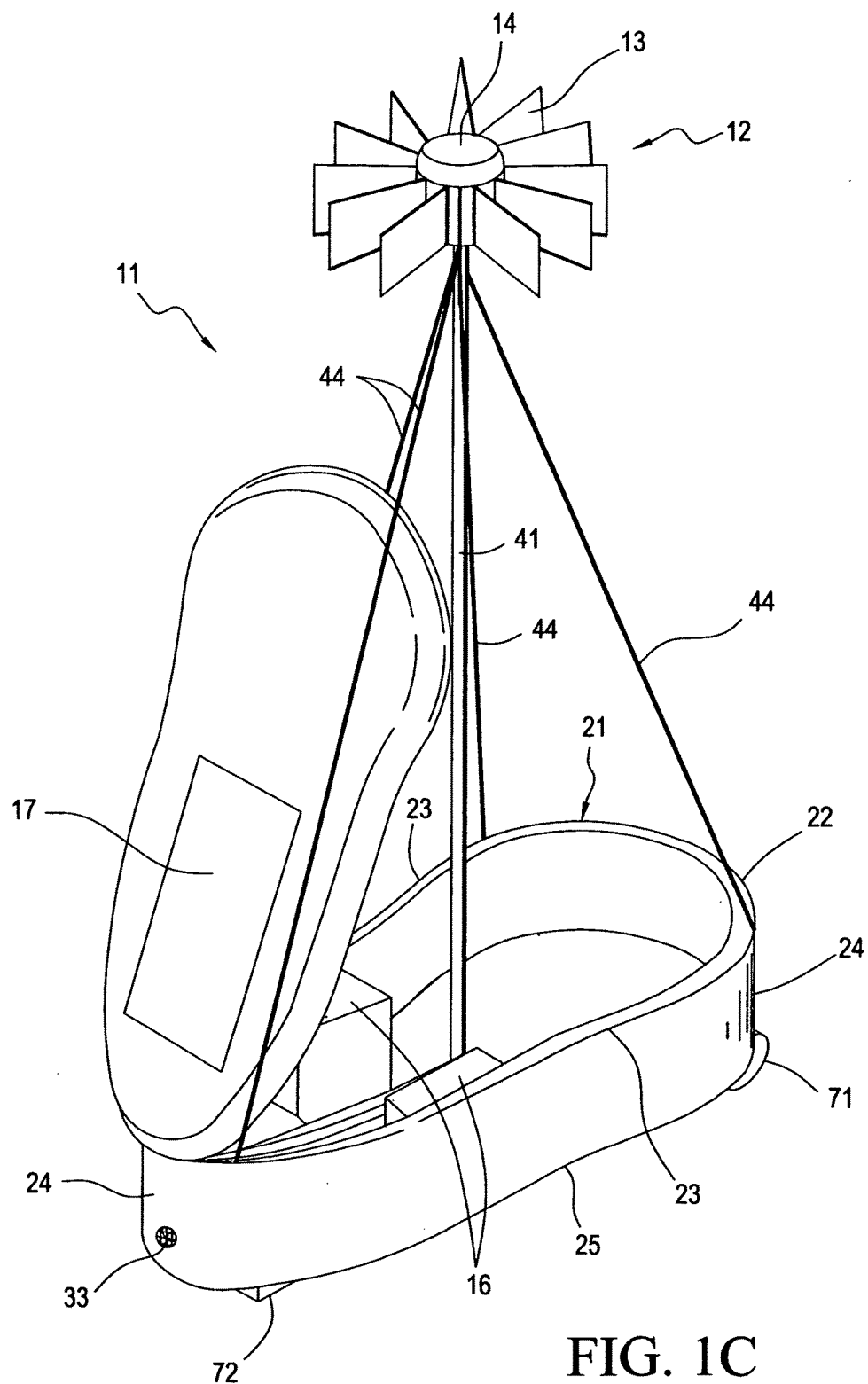
FIG. 1C is a perspective view of the generator unit in ground position with its case shown open and its turbine in vertical position.
Figure 1D:
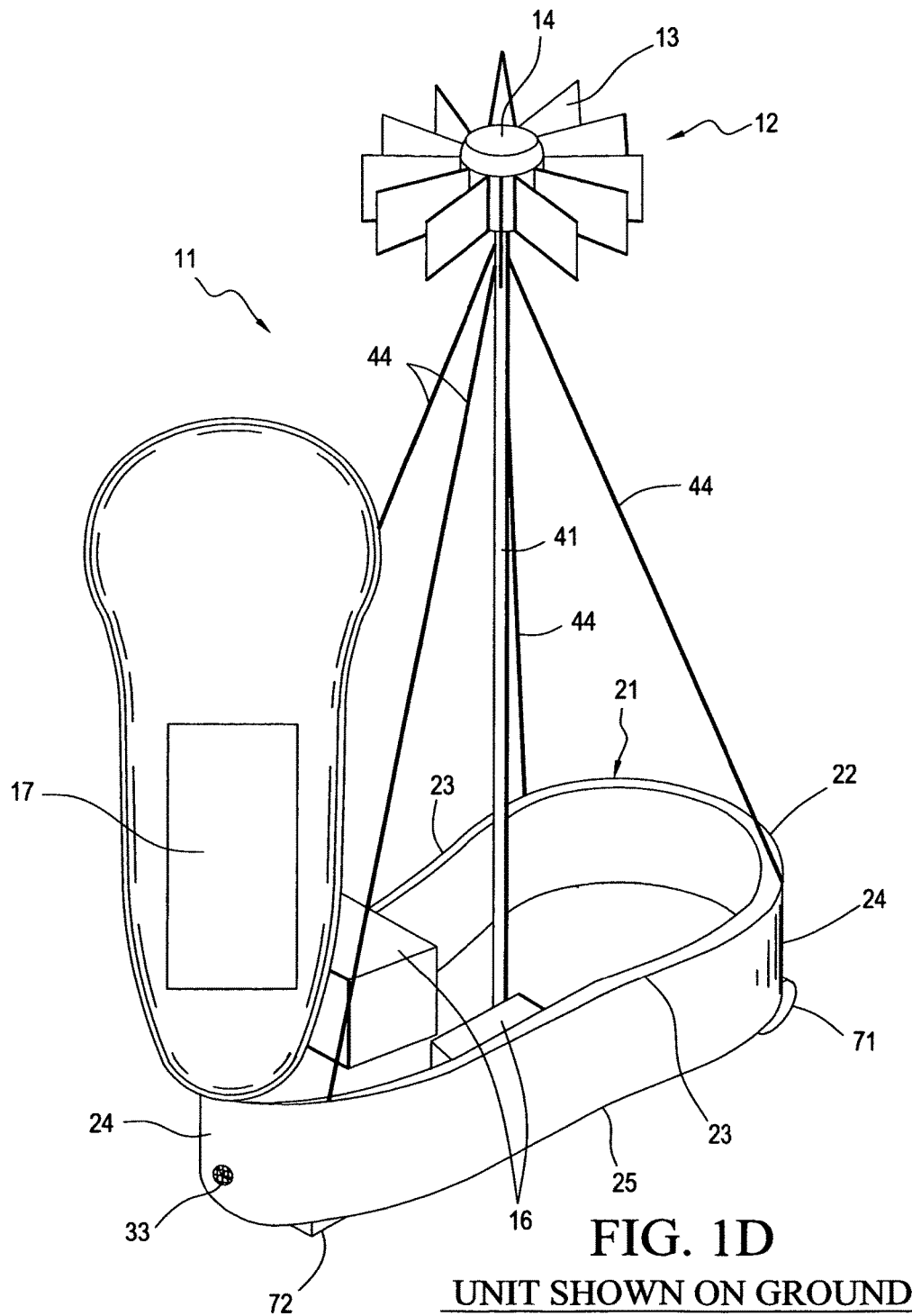
FIG. 1D is a perspective view similar to FIG. 1C, but with its cover rotated for facing the solar panel towards a light source.
Figure 2C:
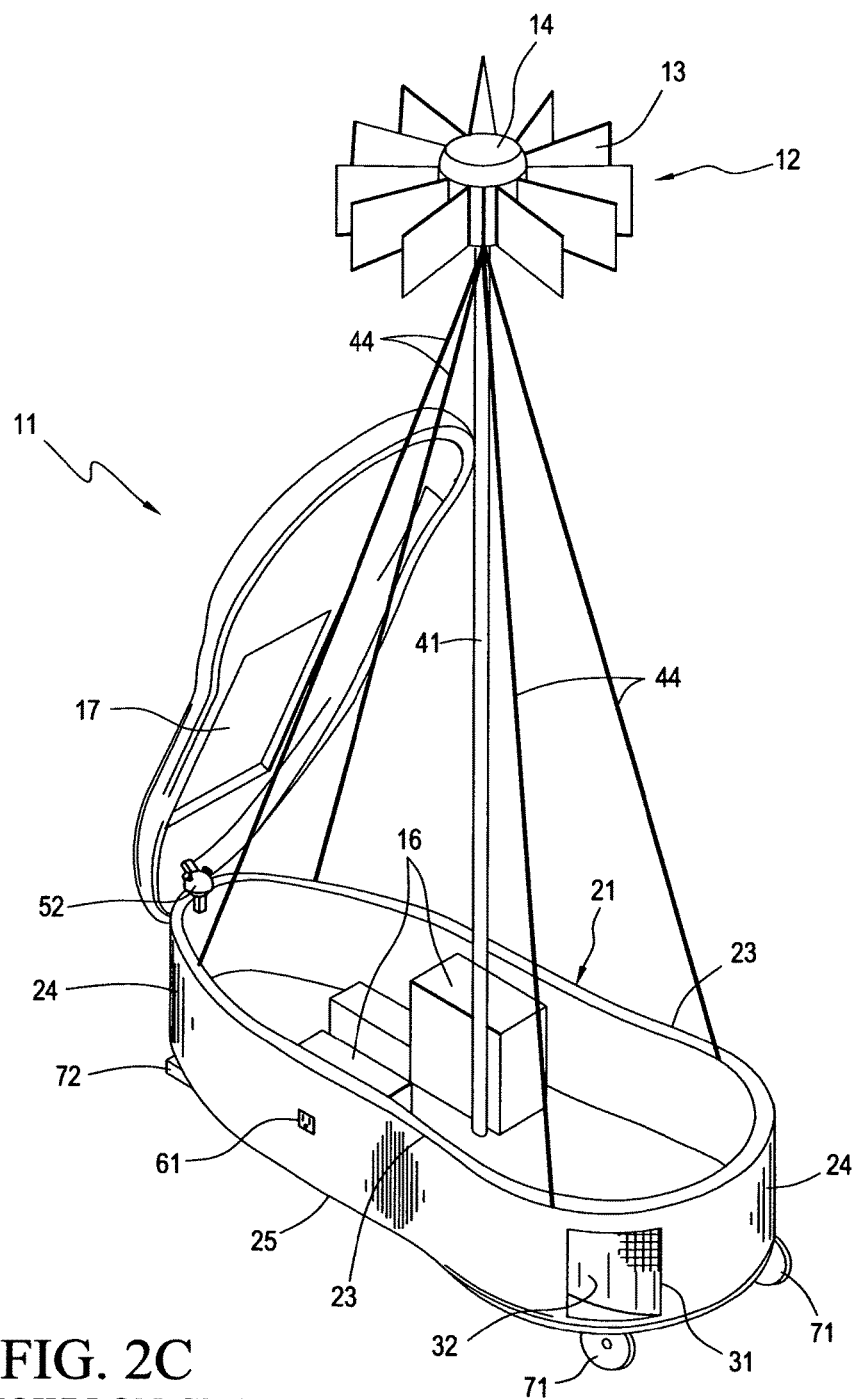
FIG. 2C is a perspective view similar to FIGS. 2A and 2B with the generator unit in ground position with its case shown open and its turbine in vertical position.
Figure 2D:
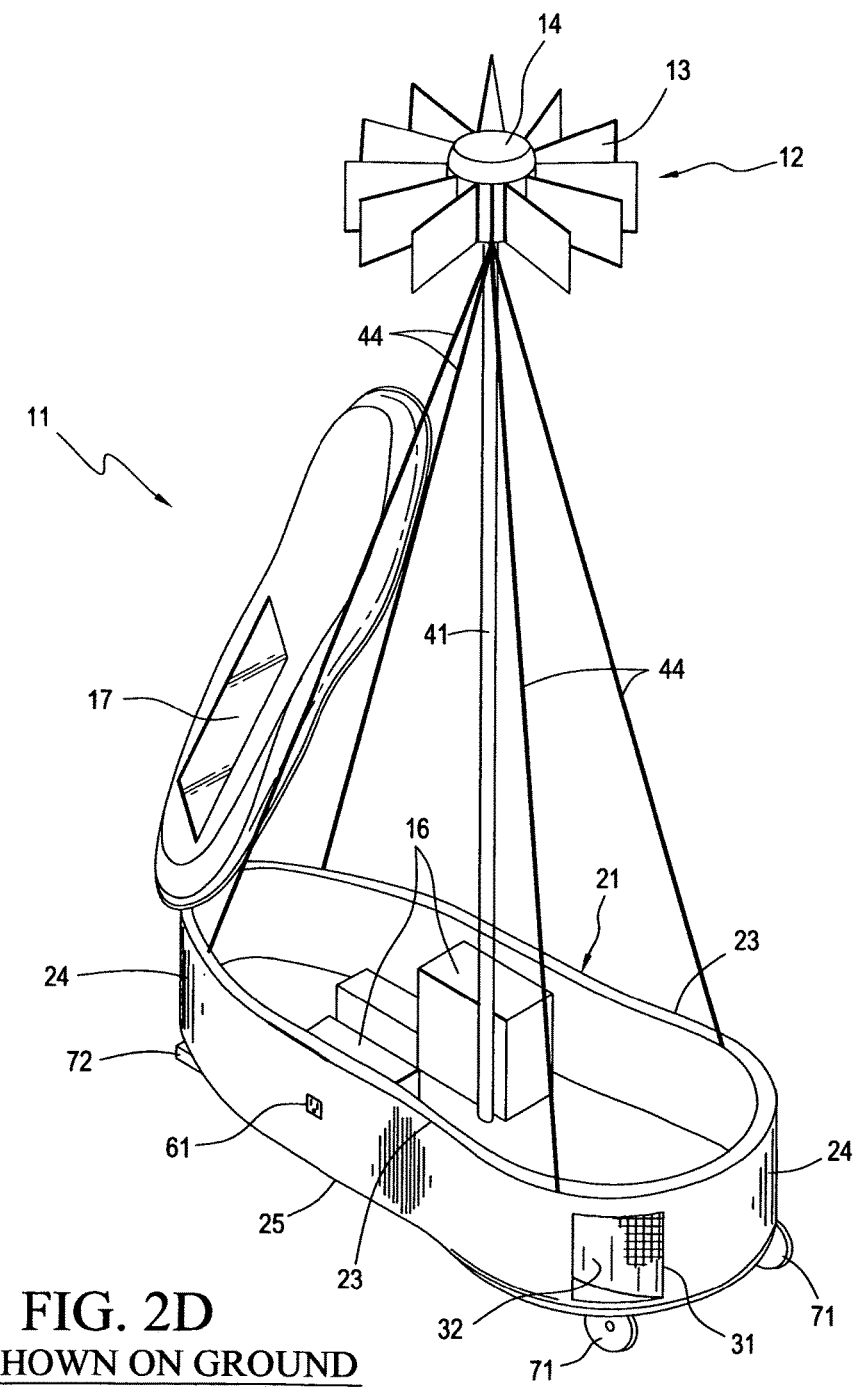
FIG. 2D is a perspective view similar to FIG. 2C but with its cover rotated for facing the solar panel towards a light source.

As best seen in FIGS. 1B, 2B and 2D, case 21 includes retractable wheels 71 and handle 72 to allow for removal and relocation of the generator 11.

The generator 11 is seen as capable of producing electricity through wind power and solar energy when mounted on a moving vehicle or in a static position for campsites, worksites, hunting lodges, etc., in difficult areas to access such as for medical usage, water pumping, etc. The generator 11, if desired, can be hard-fastened to a vehicle, or, as preferred, be removable therefrom and be used in a static position.

In FIG. 3A, generator 11 is affixed to a vehicle on a support structure and for generating electricity when the vehicle is moving and the case 21 is in closed position. When the vehicle is parked, case 21 may be opened, shaft 41 raised to capture ambient air in that position, as shown in FIGS. 1C, 1D, 2C and 2D.

In FIG. 3B, the case 11 is seen being pulled from its handle 72 and on its wheels 71 by a pedestrian.

It should be obvious that changes, additions and omissions may be made in the details and arrangement of parts without departing from the spirit and scope of the invention as hereinafter claimed.

What is claimed is:

1. A portable electrical power generator comprising:
A case having:
an aerodynamic front smoothly transitioning to symmetrical air-foil shaped sidewalls, Kamm tail rear and, flat base;
an air entrance hole within the front of the case, offset with respect to the front to rear axis of the case, for capturing desired air flow; and,
an air escape hole within the rear of the case for directing air out of the case from the interior of the case; and,
a wind turbine including:
a blade assembly; and,
a generating unit operatively coupled for developing electrical power when the blade assembly is exposed to a flow of air from the offset air entrance hole.

2. The power generator of claim 1 including a funnel shaped channel formed in the interior of a sidewall for capturing the wind from the air entrance hole and directing it towards the turbine blade assembly.

3. The generator of claim 1 including a solar array mounted within the case cover and electrically connected to the batteries.

4. A portable electrical power generator comprising:
a case having
an aerodynamic front smoothly transitioning to symmetrical air-foil shaped sidewalls, Kamm tail rear and, flat base;
an air entrance hole within the front of the case, offset with respect to the front to rear axis of the case, for capturing desired air flow; and,
an air escape hole within the rear of the case for directing air out of the case from the interior of the case;
a wind turbine including
a blade assembly, and,
a generating unit operatively coupled for developing electrical power when the blade assembly is exposed to a flow of air from the offset air entrance hole;
a telescoping shaft hingedly connected to the base supporting the wind turbine in a horizontal position for receiving wind within the case, to a vertical position for receiving wind without the case;

the shaft also being hinged at the top to allow for wind turbine repositioning when the shafts in a vertical position;

an elliptical, funnel-shaped channel extending from the air entrance hole towards the turbine blades and formed in the interior of a sidewall for capturing the wind from the air entrance hole and directing it towards the turbine blade assembly to effect rotation of its blades;

one or more batteries within the case connected to the turbine power generating unit for storing the electrical energy developed;

a DC inverter within the case for converting AC from the turbine generator unit and supplying it to the batteries and directly to DC electrical equipment;

an AC inverter within the case for receiving power from the batteries to supply energy to AC electrical equipment;

an electrical outlet connected to the inverters; and, a hinged somewhat rounded cover for the case that in closed position forms a water tight seal with the sidewalls for the case and in open position allows for redirection.

5. The generator of claim 4 including a solar array mounted within the case cover and electrically connected to the batteries.

6. The generator of claim 4 including guy wires for supporting the shaft in vertical position.

7. The generator of claim 4 including screens covering the air entrance and air escape holes.

8. The generator of claim 4 including wheels partially recessed towards the front of the case base.

9. The generator of claim 4 including a telescoping handle for transporting and relocation, mounted on the case base towards the rear.

10. The generator of claim 4 wherein the batteries and inverter are held within the case in waterproof boxes.

* * * * *